United States Patent [19]
Cole

[11] Patent Number: 6,007,699
[45] Date of Patent: Dec. 28, 1999

[54] AUTOTHERMAL METHODS AND SYSTEMS FOR FUELS CONVERSION

[75] Inventor: Jerald A. Cole, Long Beach, Calif.

[73] Assignee: Energy and Environmental Research Corporation, Irvine, Calif.

[21] Appl. No.: 08/700,838

[22] Filed: Aug. 21, 1996

[51] Int. Cl.[6] ................ C01B 3/02; C01B 3/04; C01B 3/26; C10G 35/06

[52] U.S. Cl. ............ 208/134; 208/135; 208/136; 208/137; 208/400; 252/373; 422/198; 422/211; 423/351; 423/418.2; 423/648.1; 423/652; 423/653; 423/654; 423/658.2; 423/659

[58] Field of Search .................. 423/659, 650, 423/651, 652, 351, 418.2, 648.1, 653, 654, 658.2; 252/373; 422/198, 211; 208/134, 400, 135, 136, 137

[56] References Cited

U.S. PATENT DOCUMENTS

| | | | |
|---|---|---|---|
| 4,216,199 | 8/1980 | Erickson | 423/657 |
| 5,339,754 | 8/1994 | Lyon | 110/345 |
| 5,509,362 | 4/1996 | Lyon | 110/345 |

*Primary Examiner*—Wayne Langel
*Attorney, Agent, or Firm*—Workman, Nydegger & Seeley

[57] ABSTRACT

A process for oxidizing fuel and transferring the heat produced to a particular use in a combustion system such as fuels conversion. A bed of a mixture of materials forming an unmixed combustion catalyst, which in an oxidized state is readily reducible and in a reduced state is readily oxidizable, is placed in efficient thermal contact with a heat receiver for use in the combustion system. Fuel and air are alternately contacted with the bed, whereby the fuel is oxidized, the air is depleted of oxygen, and heat is liberated. The heat is efficiently transferred to the heat receiver by careful selection of the materials of the bed such that the temperatures produced when the fuel is oxidized and when the air is depleted of oxygen are advantageous to the particular use in the combustion system.

34 Claims, 4 Drawing Sheets

AUTOTHERMAL METHODS AND SYSTEMS FOR FUELS CONVERSION

BACKGROUND OF THE INVENTION

1. The Field of the Invention

The invention relates generally to methods for producing and utilizing heat by oxidizing fuels without mixing the fuels with air and thereby producing a fire. More particularly, the invention is directed to an autothermal process for fuels conversion, including methods and systems for generating heat by oxidizing fuel without mixing the fuel with air, with the subsequent transfer and utilization of the generated heat being an improvement over the heat transfer which is possible when fire is used to produce heat.

2. The Relevant Technology

Historically, the primary method by which mankind has used fuel to generate heat has been fire. For many applications, however, the use of fire to produce heat has a number of substantial disadvantages and limitations. One of the limitations of fire is that mixtures of fuel and air must contain more than some critical amount of fuel in order to burn. This is the well known flammability limit.

Another of the limitations of fire relates to its thermodynamics, i.e., fire is an irreversible process. While energy can neither be created nor destroyed, it can become less available for doing useful work. A fuel contains chemical energy, some fraction of which is potentially available to do useful work. Upon combustion of a fuel by fire, that chemical energy is converted into heat energy. The fraction of this heat energy which is potentially available to do useful work is less than the fraction of the chemical energy which was potentially available to do useful work.

A further disadvantage of fire relates to heat transfer. For all fuels in common usage, combustion produces hot gases. In many applications it is necessary to recover heat from these hot gases. This is commonly done by passing the hot gases over heat transfer surfaces, but the amount of heat that can be transferred between hot gases and a fixed amount of solid surface is generally relatively low. Thus, to recover the heat efficiently, large amounts of heat transfer surface are needed. For industrial processes using fire as a heat source, the cost of providing heat transfer surfaces to recover the heat is frequently a major part of the total process cost.

Fire also has the property of being an intense phenomenon. For a flame to sustain itself, large amounts of heat must be liberated at very high temperatures with a very high rate of heat release. For many applications heating in a more controlled manner is needed. For these applications electrical heating is frequently used.

In efforts to overcome one or another of the disadvantages of fire, a number of alternatives to fire have been proposed. The flammability limits are a problem in some situations, i.e., there are industrial operations which produce mixtures of one or more toxic organic materials with air. These mixtures must be disposed of in an environmentally acceptable manner, but frequently they are below the flammability limit and hence will not sustain a fire. One frequently employed solution to this problem is the use of catalytic incineration wherein the mixture of air and toxic organic matter is passed through an oxidation catalyst.

In an article by H. J. Richter et al., *Reversibility of Combustion Processes*, Efficiency and Costing, Second Law Analysis of Processes, ACS Symposium Series 235, pp. 71–85 (1983), an alternative to fire is proposed in combustion processes. The teachings of this article are restricted to providing improvement of thermodynamic efficiency, however, with no teaching or suggestion of any means for improving heat transfer.

Fluid bed combustion is also an alternative to fire. In some applications, fluid bed combustion can provide better heat transfer than can fire. In other applications, there are substantial heat transfer problems that the use of fluid bed combustion does not avoid.

One example of an application with substantial heat transfer problems is the industrial process known as steam reforming in which hydrogen is produced by passing steam and a hydrocarbon through a nickel catalyst. Typically this is done at temperatures in the range of about 700° C. to 800° C. and at pressures of about 100 to 700 psig. These conditions are too severe for the use of reaction vessels made of mild steel or even stainless steel. Despite their great cost, inconel or some other high nickel alloy must be used. Furthermore, heat must be supplied since the reaction is highly endothermic. While the heat needed can readily be generated by burning fuel, transferring this heat to where it is needed is a problem since the catalyst is in the form of a packed bed. Packed beds are poor conductors of heat and the outer sections of the bed tend to insulate the inner sections. In order to get an adequate rate of heat transfer to the interior of the reaction vessel, the reaction vessels used are long narrow tubes. Thus, to get an adequate rate of heat transfer it is necessary to use very large amounts of expensive alloy tubing.

To avoid this disadvantage there have been proposals to do what is called "adiabatic" steam reforming. Department of Defense Report Number AD-A134224, *Evaluation of Adiabatic Reformer in Mixed-Gas-Cycle*, by the Power Systems Division of United Technologies Corporation (1983), is a typical example of this technology. In this approach, the heat necessary for the endothermic steam reforming reaction is provided by adding some air to the steam hydrocarbon mixture passing through the reactor. The oxygen in the air reacts with the hydrocarbon, liberating heat. Unfortunately, however, combustible mixtures either ignite or they do not. If ignition does not occur, the needed heat is not liberated. If ignition does occur, the heat is not liberated throughout the reactor where it is needed but at the point of ignition. Since the heat is not liberated uniformly throughout the reactor, there is again a severe heat transfer problem.

The gasification of coal with water is, like steam reforming, an endothermic reaction. A proposal for the improvement of this endothermic reaction has been advanced in an article by G. P. Curran et al., $CO_2$ *Acceptor Gasification Process*, Fuel Gasification Symposium, ACS Advances in Chemistry Series 69, Chapter 10, pp. 141–165 (1966). In this article, which is typical of the art, the use of CaO as an acceptor for $CO_2$ is suggested. The reaction $CO_2 + CaO = CaCO_3$ is highly exothermic thereby supplying the heat consumed by the endothermic gasification reaction. Furthermore, $CO_2$ and CO are in equilibrium via the water gas shift reaction $H_2O + CO = CO_2 + H_2$. Consequently, removing the $CO_2$ has the effect of also removing the CO, allowing the production of a gas containing a large mole fraction of hydrogen. Unfortunately, however, for this process to be practical it is necessary to reconvert the $CaCO_3$ back to CaO. While the heat necessary to do this could readily be generated by burning some fuel, transferring that heat to where it is needed is again a difficult and expensive problem.

Heat transfer is also a substantial problem in other industrial processes in which packed bed reactors are used to carry out endothermic reactions. Examples of such reactions include but are not limited to the cracking of ammonia to make hydrogen/nitrogen mixtures, the gasification of biomass, the catalytic reforming of petroleum hydrocarbons, and the decomposition of methanol.

Another group of applications in which heat transfer is a substantial problem involves the use of packed beds of sorbents. Typically, a gas containing some impurity is passed through the packed bed, the impurity being removed by a sorbent through adsorption or absorption. When the sorbent approaches saturation with the impurity, the sorbent must be regenerated. This is commonly done by heating the packed bed to drive out the impurity. Since, however, the outer portions of the bed tend to insulate the inner portions, heat transfer is not effectively achieved.

Yet another example of a technological problem for which presently available combustion and heat transfer technology do not provide a satisfactory solution is the production of shale oil. The United States has vast reserves of what is commonly referred to as oil shale, i.e., deposits of rock which yield oil when sufficiently heated. No economically acceptable method of producing oil from this resource is presently available because of the limitations of presently available combustion and heat transfer technology. For example, when shale rock is placed into a packed bed retort and heat is supplied to the exterior of the retort, the outer layers of the shale rock insulate the inner layers. This results in unacceptably slow rates of heat transfer and liberation of the oil from the rock. In principal, use of a fluid bed retort would provide a much higher rate of heat transfer, but once shale rock is retorted, it has a tendency to crumble into fine powder. This fine powder tends to fly out of the fluid bed, making operation of the process quite difficult.

From the examples above, it is clear that there is a need in the art for a new method of burning fuel which allows more effective heat transfer than is possible with fire and the presently available alternatives to fire, and accomplishes this without increasing emissions of pollutants.

In the work of R. K. Lyon described in U.S. Pat. Nos. 5,339,754 and 5,509,362 (hereafter the "Lyon Patents"), a method is described for improving heat transfer by using a method called unmixed combustion. In unmixed combustion, a metal is dispersed on a high surface area support. When this metal is exposed to air or a gas containing oxygen, the metal is oxidized producing a significant amount of heat. The gaseous product of this reaction is air that has been depleted of the oxygen consumed by reaction with the metal. Subsequently a gaseous organic fuel is passed over the hot metal oxide. Reaction between the fuel and the metal oxide results in the oxidation of the fuel to produce $CO_2$ and $H_2O$, with the simultaneous production of additional heat and chemical reduction of the metal back to the original state.

In the process described in the Lyon Patents, a single metal is used, and although it is suggested that mixtures of metals may be used, no example of this is provided, nor is any benefit of using mixtures of metals described. Examples of metals described by the Lyon Patents include silver, copper, iron, and nickel. Depending on the process temperature, the fuel oxidation step may either be exothermic, thermoneutral, or endothermic. In general, the metal oxidation step will be strongly exothermic. Furthermore, in the process described in the Lyon Patents, the metal undergoes a transition between the metal in its standard state and one or more oxidation states of the metal. For many applications, this would not be a deficiency. However, in several applications, this would be a deficiency by prohibiting practical use of the process, reducing process efficiency, or requiring that the process be complicated by the addition of heat exchange and heat transfer surfaces which the process of the Lyon Patents is in part intended to avoid.

For example, in the case of the production of hydrogen from diesel fuel in a single step, copending U.S. application Ser. No. 08/428,032 to Lyon, issued as U.S. Pat. No. 5,827,496 on Oct. 27, 1998, the disclosure of which is incorporated by reference, teaches that this process can be conducted by using nickel and nickel oxide, respectively, as the metal and metal oxide. During the first step of the Lyon process, nickel oxide and a fuel, such as methane or a petroleum distillate, react to produce some of the energy required to permit the reforming reaction between additional fuel and steam, fuel+$H_2O$=$CO$+$H_2$ and the subsequent water-gas shift reaction, $CO$+$H_2O$=$CO_2$+$H_2$, to produce hydrogen. The remaining energy required for the production of hydrogen from fuel and steam is provided by the reaction between $CO_2$ and $CaO$ to form $CaCO_3$. This total process can in fact be shown to produce more energy than is required to cause the efficient production of hydrogen. The excess energy is carried away as sensible heat of the product gases. During a subsequent regeneration step, air is allowed to react with the nickel to produce nickel oxide. The energy produced by this reaction is sufficient to cause the $CaCO_3$ to decompose.

However, it can be shown that while the energy produced in the above Lyon process is sufficient for the decomposition of $CaCO_3$, the resulting temperature of the reactor will not be high enough to permit the decomposition of all of the $CaCO_3$. In other words, the conditions in the reactor as described in the Lyon Patents do not thermodynamically favor the complete decomposition of the $CaCO_3$. Therefore, unless an additional source of heat is supplied to the reactor during the regeneration step, for example, by external heating by the effluent gases from a second reactor that is simultaneously undergoing the reforming step, all of the $CaCO_3$ will not be decomposed. During subsequent reforming and regeneration steps, the $CaO$ will be slowly consumed and will be unable to react with $CO_2$, thereby shutting the reaction down. There exists a method for avoiding this deficiency within the Lyon process as described, which is to reduce that portion of the total fuel that is to be converted to hydrogen. Thus, the amount of $CaCO_3$ produced will be lower relative to the amount of nickel oxide that is reduced to nickel metal, and the heat released during the oxidation of the nickel metal will be sufficient to decompose the smaller amount of $CaCO_3$. However, this will reduce the thermodynamic efficiency of the total process.

SUMMARY AND OBJECTS OF THE INVENTION

A principle object of the present invention is to provide an improved combustion system in which two or more metals and their oxides, as well as other compounds, are combined and used in an unmixed combustion method.

A further object of the invention is to utilize an unmixed combustion method in various applications to balance the amount of heat released between the steps of oxidation and reduction in order to better meet the needs of the process to which it is being applied.

Still another object of the invention is to provide a combustion system allowing the production and transfer of heat in a readily controlled manner.

Additional objects and advantages of the invention will be set forth in the description which follows, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, autothermal methods and systems have been developed in which fuel is oxidized without the necessity of mixing the fuel with air by alternately passing the fuel and air through a bed of an unmixed combustion catalyst, the catalyst preferably being a mixture of materials which are readily oxidized by air when in a lower oxidation state and which are readily reduced by fuel when in a higher oxidation state.

The invention includes methods and systems that are provided for supplying heat to a packed bed catalytic reactor in which endothermic reactions are carried out. The unmixed combustion catalyst may serve as a catalyst for the endothermic reaction or may be mixed with a second endothermic reaction catalyst and placed in the reactor. Since these two catalysts are in intimate contact, the heat generated by the alternate oxidation and reduction of the unmixed combustion catalyst is readily transferred to the endothermic reaction catalyst. With the unmixed combustion catalyst uniformly distributed throughout the packed bed, the packed bed can be uniformly heated.

Furthermore, if during each reduction and oxidation cycle, the amounts of fuel and air passed through the reactor are respectively sufficient to fully change the oxidation state of the unmixed combustion catalyst between the desired lower oxidation state and the desired higher oxidation state, the amount of heat liberated in any volume of the reactor will be uniform and accurately defined. Specifically the heat liberated per cycle will be exactly equal to the heat of reaction that would have been experienced had the fuel been allowed to react directly with the air. By choosing an appropriate concentration for the unmixed combustion catalyst, the rate of heat input to the reactor can be controlled to a desired level.

A method of generating and transferring heat in a combustion system according to the present invention includes selecting a mixture of two or more materials to form an unmixed combustion catalyst which in a reduced state is readily oxidized and in an oxidized state is readily reduced. The mixture of materials is selected such that the heat resulting during an oxidation cycle of the catalyst is in a first temperature range useful in operating the combustion system, and the heat resulting during a reduction cycle of the catalyst is in a second temperature range useful in operating the combustion system. The unmixed combustion catalyst is placed in efficient thermal contact with a heat receiver in the combustion system. The catalyst is alternately contacted, to release and transfer heat to the heat receiver, with an oxygen-containing gas to oxidize the catalyst and generate heat in the first temperature range, and with a reducing gas to reduce the catalyst. The reaction of the reducing gas with the catalyst is an exothermic, thermoneutral, or endothermic reaction, as required to generate or absorb heat to produce the second temperature range.

A combustion system for generating and transferring heat includes the above unmixed combustion catalyst including a mixture of two or more materials and a heat receiver in efficient thermal contact with the unmixed combustion catalyst. A suitable heat receiver includes endothermic chemical processes such as the steam reforming of hydrocarbon fuels to produce hydrogen, the recovery of shale oil from shale rock, and the regeneration of solid sorbents, among others. The system further includes a means for alternately contacting the unmixed combustion catalyst with an oxygen-containing gas to oxidize the catalyst and generate heat, and a reducing gas to reduce the catalyst. A heat exchanger in communication with the oxygen-containing gas and an outlet from the unmixed combustion catalyst can also be provided in the combustion system. In one embodiment, the unmixed combustion catalyst is disposed in a catalytic reactor that is surrounded by an insulating structure. The catalytic reactor is in communication with the heat exchanger and a source of fuel and water. In another embodiment, the combustion system can employ an unmixed combustion catalyst made of a single oxidizing/reducing material, as long as a heat exchanger is also used in the system.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
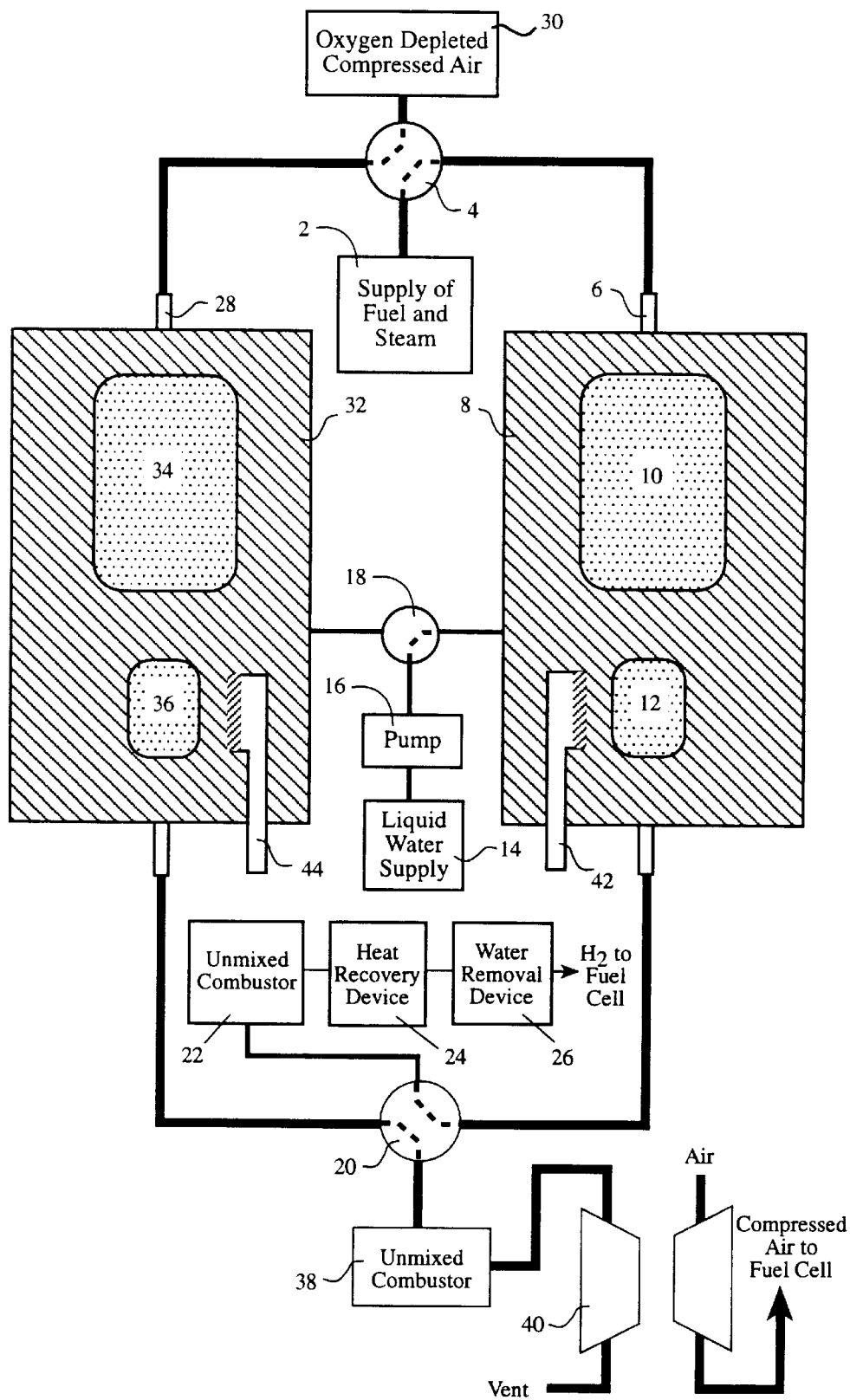
FIG. 1 illustrates a packed bed reactor system for producing high purity hydrogen for use in fuel cells.

The present invention is directed to methods and systems for efficiently transferring heat within combustion systems for a particular use. The invention represents an improvement in the prior state of the art in that the methods and systems for efficiently transferring heat within combustion systems pay particular attention to the temperature at which that heat is transferred. An autothermal process utilized in the invention has been developed in which fuel is oxidized without the necessity of mixing the fuel with air, by alternately passing the fuel and air through a bed of an unmixed combustion catalyst. The term "autothermal" as used herein means that the heat required to drive a process is produced within, not external to, the process and as the heat is needed, both locally and temporally. The term "unmixed combustion catalyst" as used in the specification and the appended claims corresponds to a material or mixture of materials which is readily reduced by a fuel or other reducing gas when in a higher oxidation state and readily oxidized by an oxygen-containing gas such as air when in a lower oxidation state.

In accordance with the present invention, an unmixed combustion catalyst is placed in efficient thermal contact with a heat receiver. Examples of the heat receiver include $CaCO_3$, boiling water, a reforming reaction in a combustion system, a catalyst system requiring regeneration, and an adsorbent or absorbent material during regeneration. In particular, a suitable heat receiver can be endothermic chemical processes such as the steam reforming of hydrocarbon fuels to produce hydrogen, the recovery of shale oil from shale rock, and the regeneration of solid sorbents. The unmixed combustion catalyst used in the present invention is preferably a mixture of materials which are readily oxidized by air when in a lower oxidation state and which are readily reduced by a fuel when in a higher oxidation state. The unmixed combustion catalyst is alternately contacted with a reducing gas to reduce the unmixed combustion catalyst and with a gas containing molecular oxygen to oxidize the unmixed combustion catalyst in order to release and transfer heat to the heat receiver. The oxygen-containing gas can be selected from the group of air, air to which additional oxygen has been added, air mixed with combustion products, air from which part of the oxygen has been removed, and any of the aforementioned oxygen-containing gases to which inert or combustible gases have been added.

Various configurations are provided herein for alternately exposing the reducing gas and the oxygen-containing gas to the unmixed combustion catalyst to respectively reduce and oxidize the catalyst. The present invention provides for the oxidation of fuels in combustion systems wherein the heat generated can be transferred more effectively to packed bed reactors. In addition, the present invention provides combustion methods and systems wherein heat is generated within a volume and the rate of heat generation on each portion of that volume can be accurately controlled.

In one embodiment, discussed in greater detail below, the present invention involves a process for steam reforming hydrocarbon fuels into hydrogen in a packed bed reactor of a combustion system, wherein heat is more efficiently transferred to the packed bed reactor and is transferred at temperatures advantageous to the steam reforming process. The combustion system includes a first reaction zone, containing a bed of a mixture of materials forming an unmixed combustion catalyst and calcium oxide, at a temperature in a range from about 700° C. to 1050° C. at which most of the reaction between the hydrocarbon and steam occurs. A second reaction zone is also present at a temperature of less than about 700° C. where the hydrogen produced in the first reaction zone is purified. Compressed air, partially oxygen depleted by use in a fuel cell, is used as an oxidizing agent to oxidize the unmixed combustion catalyst to a higher oxidation state. This is an exothermic reaction which generates heat, thereby causing the decomposition of $CaCO_3$, produced during a reduction cycle, to CaO and $CO_2$, and heating the partially oxygen depleted compressed air. The partially oxygen depleted compressed air is further heated by passage through a bed of additional unmixed combustion catalyst whereby any hydrogen or other fuels in the air are oxidized. The oxygen depleted compressed air is then passed through a turboexpander to generate power, which drives a turbocompressor to produce compressed air for use in the fuel cell.

In a further embodiment of the invention, heat is supplied to a packed bed of a sorbent to thermally regenerate the sorbent. The unmixed combustion catalyst is placed in the packed bed in efficient thermal contact with the sorbent. Examples of the sorbent that can be utilized include activated carbons and charcoals used to remove volatile organic compounds from a ventilation air stream, or from a process waste gas stream.

In another embodiment, the combustion system includes a catalytic reactor for housing the unmixed combustion catalyst made from a mixture of at least two oxidizable/reducible materials to carry out an endothermic reaction, and a source of a fuel for producing the reducing gas.

In an additional embodiment, the combustion system has a heat exchanger in communication with the oxygen-containing gas and an outlet from the unmixed combustion catalyst. The catalyst can be made from a single oxidizable/reducible material or a mixture of such materials when a heat exchanger is utilized in the combustion system.

Although all combustion systems may be within the scope of the present invention, for the sake of clarity and example, the present invention is set forth hereinbelow by providing specific examples of the present invention as related to packed bed catalytic reactors. The specific teachings of the present invention can, however, be applied to any combustion system.

A. Mass Transfer Catalysis vs. Chemical Reaction Catalysis

The present invention includes methods and systems for effecting oxidation in a combustion device, such as supplying heat to a packed bed catalytic reactor in which an endothermic reaction is carried out. It is a feature of the present invention to use a mass transfer catalyst to oxidize fuel.

Mass transfer catalysis should be considered in contrast to the common chemical reaction catalysis such as exemplified by the pollution control systems used in automobiles. The exhaust coming out of an engine contains CO and unburned hydrocarbons. Depending on the air to fuel ratio at which the engine is operating, the exhaust gas may also contain oxygen. If it does not, air is added to the exhaust which is passed over a noble metal catalyst. The amount of air added needs to be accurately controlled. If too much cold air is added, the temperature of the air/exhaust gas mixture will be too low and the catalyst will not be able to cause complete reaction. On the other hand, if too little air is added it will not be sufficient for complete reaction of the CO and unburned hydrocarbons, and some of these will be discharged to the atmosphere unoxidized.

The noble metals of iridium, platinum, palladium, rhodium, and rhenium are some of the most effective catalysts for the chemical reaction of oxidation. These noble metals are so effective that noble metal catalysts commonly contain extremely small amounts of the noble metal, i.e., noble metal catalysts containing only about 0.01 weight percent noble metal or less are common. Thus, when air and exhaust gas are passed through a noble metal catalyst, the noble metal promotes the oxidation reaction but does not store any significant quantity of oxygen since there is not enough of it present for such storage. If at any instant the air supplied is not adequate for complete combustion, the combustion will be incomplete.

Unlike chemical reaction catalysts, a mass transfer catalyst facilitates the mass transfer of a reactant, an entirely different type of action. The present invention utilizes a mass transfer catalyst to oxidize fuel in various combustion systems, i.e., the invention uses an unmixed combustion catalyst.

The unmixed combustion catalyst can be formed from a wide variety of materials, such as silver/silver oxide, copper/copper oxide, iron/iron oxide, cobalt/cobalt oxide, tungsten/tungsten oxide, manganese/manganese oxide, molybdenum/molybdenum oxide, nickel/nickel oxide, tin/tin oxide, strontium sulfide/strontium sulfate, barium sulfide/barium sulfate, iron(II) oxide/iron(III) oxide, iron(II) oxide/iron(II, III) oxide, iron (II,III) oxide/iron(III) oxide, cobalt(II,III) oxide/cobalt(IV) oxide, chromium(III) oxide/chromium(IV) oxide, manganese(II,III) oxide/manganese(IV) oxide, calcium molybdite/calcium molybdate, and various mixtures thereof. The materials are selected so that the heat generated or absorbed during each of the oxidation and reduction cycles is adjusted to an optimum temperature range for use in the combustion system.

In various preferred embodiments, the unmixed combustion catalyst includes a nickel/nickel oxide material mixed heterogeneously with another oxidizing material such that the oxidation and reduction cycles result in favorable process temperatures that improve thermodynamic efficiency so as to permit the combustion system to be continuously operated without supplying an external source of heat. For example, preferred readily oxidized/readily reduced mixtures of materials for use in the present invention include nickel/nickel oxide mixed with either tin/tin oxide, iron/oxides of iron, or calcium molybdite/calcium molybdate. One preferred catalyst is formed from a mixture of materials that includes nickel/nickel oxide mixed with iron/iron(II) oxide and iron/iron(III) oxide. The preferred temperature range for this catalyst as well as the other preferred catalysts made from nickel/nickel oxide mixed with tin/tin oxide or calcium molybdite/calcium molybdate is from about 600° C. to 1100° C. The above preferred catalysts are particularly useful in steam reforming reactions, and have a first temperature range during the oxidation cycle of the catalyst from about 900° C. to 1100° C., and a second temperature range during the reduction cycle of the catalyst from about 600° C. to 950° C. Other preferred mixtures of metals and metal oxides that may be used as the unmixed combustion catalyst include calcium molybdite/calcium molybdate, strontium sulfide/strontium sulfate, and barium sulfide/barium sulfate, in various combinations thereof, and having other preferred temperature ranges.

In some embodiments of the present invention, the unmixed combustion catalyst can be supported on a porous ceramic material. The porous ceramic can be selected from materials such as silica, alumina, magnesia, silicon carbide, zeolites, cordierite, and combinations or mixtures thereof. Preferably, the porous ceramic material is or contains alumina.

B. Supplying of Heat to Packed Bed Reactors

There are many industrial processes in which it is necessary to supply heat to a packed bed reactor. Fire is an unsatisfactory method for generating such heat because transferring heat from the exterior of a packed bed to the interior is a slow and difficult process. For some of these industrial processes, however, it is feasible to blend an unmixed combustion catalyst into the packed bed. This allows the heat to be generated where it is needed and thus avoids problems of heat transfer.

One instance in which unmixed combustion can be advantageously used is in the production of hydrogen. It is well known that any of a number of catalysts, such as nickel and noble metals supported on alumina, can be used to catalyze the reaction of hydrocarbons with water to produce hydrogen. This method of hydrogen production, however, has two problems. First, there is the difficulty that the hydrogen produced is not pure but is in equilibrium with CO, $CO_2$ and $H_2O$ via the reaction $CO+H_2O=CO_2+H_2$. Second, there is the problem that the reaction is strongly endothermic and must be supplied with heat. One of the methods used in the prior art to supply the necessary heat involves causing the reaction to occur on the inside of metal tubes filled with a catalyst while passing hot gases from a fire over the outside of these tubes. This approach, however, has the disadvantage that the tubes must tolerate very high temperatures and thus must be made of relatively expensive materials. Since large amounts of these expensive tubes are required to obtain adequate rates of heat transfer, the total cost for this approach is quite high.

Calcium oxide (CaO) has been used in hydrogen production to avoid the need for external heat and the undesired carbon dioxide by-product. An advantage of using CaO is that it can react with $CO_2$ to form $CaCO_3$. This removal of $CO_2$ drives the equilibrium reaction to the right, allowing the production of nearly pure hydrogen. Furthermore, since the formation of $CaCO_3$ is highly exothermic, the heat it generates can supply the heat needed for the reaction of water and the hydrocarbon.

Thus, the use of CaO provided a satisfactory solution to both problems but it introduced a new problem: how to reconvert the $CaCO_3$ back to CaO. The decomposition of $CaCO_3$ to CaO and $CO_2$ requires supplying large amounts of heat, which was not accomplished in a satisfactory method by the prior art.

The use of unmixed combustion, however, solves this problem. FIG. 1 illustrates a packed bed reactor system of the present invention using unmixed combustion to produce high purity hydrogen for fuel cells. A supply source 2 provides a flowing stream of steam and a liquid or gaseous hydrocarbon fuel at a pressure greater than about 60 psig to a first four-way valve 4. The hydrocarbon fuel, which forms a reducing gas, can be natural gas, a liquid hydrocarbon, a fuel selected from the group of petroleum distillates including kerosene, gasoline, diesel fuel, and jet fuel, an emulsion of a hydrocarbon or liquid petroleum fuel in water including emulsions of bitumen or bitumen products in water, carbon monoxide, or mixtures thereof. The four-way valve 4 in turn directs the flowing stream into the top of a first reactor 6. The reactor 6 is covered with an insulation layer 8 and has a main interior section 10 as well as a smaller interior section 12. Both main interior section 10 and smaller interior section 12 contain a mixture of two catalysts. One of the catalysts is a heat receiver which is a $CO_2$ acceptor selected from the group of calcined limestone, calcined dolomite, thermally decomposed salts of calcium oxide supported on a porous ceramic, or mixtures thereof. The other catalyst is supported on a porous ceramic such as alumina and preferably includes a heterogeneous mixture of nickel/nickel oxide (Ni/NiO) and tin/tin oxide ($Sn/SnO_2$).

Conditions are adjusted so that the temperature in main interior section 10 is in a range from about 600° C. to about 800° C. The steam and hydrocarbon react to form hydrogen through an endothermic chemical reaction. This reaction goes to near completion because CaO reacts with $CO_2$ to form $CaCO_3$. However, the removal of $CO_2$ and CO is not entirely complete since the equilibrium pressure of $CO_2$ above $CaO/CaCO_3$ has a finite value when the temperature is in a range from about 600° C. to 800° C.

As the impure hydrogen leaves main interior section 10, liquid water from a liquid water supply 14 is added via a pump 16 and a three-way valve 18 as shown in FIG. 1. The evaporation of the liquid water cools the impure hydrogen and maintains a temperature in smaller interior section 12 less than about 700° C., and most preferably in a range from about 200° C. to about 550° C. The equilibrium pressure of $CO_2$ above $CaO/CaCO_3$ has a lower value when the temperature is in a range from about 200° C. to 550° C. than it does in a range from about 600° C. to about 800° C. Consequently, the impure hydrogen becomes substantially pure as it passes through smaller section 12. The purified hydrogen exits reactor 6 via a second four-way valve 20, passing initially through a first unmixed combustor 22, a heat recovery device 24, and a water removal device 26. The purified hydrogen is then directed to a fuel cell.

During the formation of hydrogen in main interior section 10 and its purification in smaller interior section 12, NiO is reduced to Ni, and $SnO_2$ is reduced to Sn. The reduced nickel metal so formed acts as a chemical catalyst to increase the rate of the hydrogen production process. It is also within the scope of the present invention to replace all or part of the nickel with any noble metal catalyst that may or may not act as a mass transfer catalyst. Examples of such noble metal catalysts include iridium, platinum, palladium, rhodium and rhenium.

While reactor 6 is producing hydrogen, $CaCO_3$ in a second reactor 28 is being converted back to CaO. Fuel cells typically operate at superatmospheric pressures, typically in a range from about 15 to about 45 psig. The gas coming away from the anode side of a fuel cell has a non-zero oxygen content but as compared to air is depleted of oxygen. Thus, the fuel cell provides oxygen depleted compressed air to a supply source 30. This oxygen depleted air passes through four-way valve 4 to a second reactor 28. The second reactor 28 is covered with an insulation layer 32, and has a main interior section 34 and a smaller interior section 36. Both main interior section 34 and smaller interior section 36 contain a mixture of two catalysts as in reactor 6, including $CaO/CaCO_3$ and a mixture of Ni/NiO and $Sn/SnO_2$ on porous alumina. The oxidation of the Ni and the Sn to NiO and $SnO_2$ generates heat which partially raises the temperature of the catalyst to a temperature in the range of about 700° C. to 1050° C., promoting the decomposition of the $CaCO_3$ to CaO and $CO_2$. The $CO_2$ is then swept out of reactor 28 via four-way valve 20 to a second unmixed combustor 38.

The heat released by oxidizing the unmixed combustion catalyst with the oxygen depleted compressed air is also retained by the oxygen depleted compressed air. The oxygen depleted compressed air is further heated by oxidizing any residual gases containing molecular hydrogen with an additional unmixed combustion catalyst in unmixed combustor 38. The compressed air is then expanded by passing it through a gas turbine such as a turboexpander 40 to generate power. This power is used to drive a turbocompressor to produce compressed air that is directed to a fuel cell.

The rates of flow of steam, hydrocarbon and oxygen depleted air are mutually adjusted. This adjustment is such that as the decomposition of the $CaCO_3$ in reactor 28 nears completion, the conversion of CaO to $CaCO_3$ in reactor 6 is also approaching completion. When the reactions are completed, four-way valves 4 and 20 and three-way valve 18 all switch. When the valve switch occurs, reactor 6 contains hydrogen gas. The oxygen depleted air forces the hydrogen out of reactor 6 through four-way valve 20 and through unmixed combustor 38 to turboexpander 40. As the hydrogen passes through unmixed combustor 38 it is oxidized to water. The heat thus produced increases the ability of turboexpander 40 to do work.

Similarly, when the valves switch, reactor 28 contains oxygen depleted air. The steam and hydrocarbon entering reactor 28 force the oxygen depleted air out of reactor 28 through four-way valve 20 and through unmixed combustor 22. While the oxygen depleted air still contains some oxygen, the amount of this oxygen is, on a time average basis, small relative to the amount of hydrogen passing through unmixed combustor 22. The heat produced by the reduction of this small amount of oxygen is added to the heat recovered by heat recovery device 24. The removal of this small amount of oxygen by unmixed combustor 22 purifies the hydrogen going to the fuel cell.

Heat is required to start the system of the present invention depicted in FIG. 1 when it is first used. Heat may be supplied in a number of ways known to those skilled in the art. For example, a first startup heater 42 and a second startup heater 44 can provide the necessary startup heat to reactors 6 and 28, respectively. When the system of FIG. 1 is shut down and allowed to cool after being used, the shutdown procedure can involve using both reactors 6 and 28 to produce hydrogen. When the system is restarted, both reactors will contain Ni, Sn and $CaCO_3$. The oxidation of finely divided nickel and tin metals occurs readily at room temperature and is strongly exothermic. Thus, simply passing air first through one reactor then through the other will heat them both to an elevated temperature. Subsequently passing fuel first through one reactor and then through the other, and then repeating the step of passing air through the reactors will quickly heat both reactors to operating temperature and decompose the $CaCO_3$ to CaO and $CO_2$.

The techniques used to impart heat to the endothermic reaction occurring during the steam reforming of a hydrocarbon fuel to produce hydrogen can also be applied to other endothermic reactions, such as the decomposition of ammonia to hydrogen and nitrogen, the reforming of petroleum hydrocarbons, and the decomposition of methanol.

The present invention thus provides methods and systems for supplying heat to packed bed catalytic reactors in which endothermic reactions are carried out. The unmixed combustion catalyst may serve as a catalyst for the endothermic reaction or may be mixed with a second endothermic reaction catalyst and placed in the reactor. Since these two catalysts are in intimate contact, the heat generated by the alternate oxidation and reduction of the unmixed combustion catalyst is readily transferred to the endothermic reaction catalyst. With the unmixed combustion catalyst uniformly distributed throughout the packed bed, the packed bed can be uniformly heated.

Furthermore, if during each reduction and oxidation cycle, the amounts of fuel and air passed through the reactor are respectively sufficient to fully change the oxidation state of the unmixed combustion catalyst between the desired lower oxidation state and the desired higher oxidation state, the amount of heat liberated in any volume of the reactor will be uniform and accurately defined. Specifically the heat liberated per cycle will be exactly equal to the heat of reaction that would have been experienced had the fuel been allowed to react directly with the air. The heat liberated in any volume of the reactor will be equal to the heat of combustion of the fuel in air divided by the amount of unmixed combustion catalyst required to effect that combustion per unit volume of reactor. This is illustrated by the following equation:

$$\frac{\text{heat release}}{\text{unit volume}} = \text{heat of combustion} \times \frac{\text{unit of fuel}}{\text{unit of catalyst}} \times \frac{\text{unit of catalyst}}{\text{unit volume}},$$

$$\text{where: heat of combustion} = \frac{\text{heat release}}{\text{unit of fuel}}.$$

Thus, by choosing an appropriate concentration for the unmixed combustion catalyst, the rate of heat input to the reactor can be controlled to a desired level. The range of concentrations desired for the unmixed combustion catalyst must be determined on a case-by-case basis for each application selected.

Accordingly, the present invention provides an improved combustion system in which two or more metals and their oxides, or other oxidizing/reducing compounds, are combined and used in an unmixed combustion method. In addition, the unmixed combustion method of the invention can be utilized in various applications to balance the amount of heat released between the steps of oxidation and reduction in order to better meet the needs of the process to which it is being applied. The invention also provides a combustion system that allows for the production and transfer of heat in a readily controlled manner.

A method of generating and transferring heat in a combustion system according to the present invention includes selecting a mixture of two or more materials to form an unmixed combustion catalyst which in a reduced state is readily oxidized and in an oxidized state is readily reduced. The mixture of materials is selected such that the heat resulting during an oxidation cycle of the catalyst is in a first temperature range useful in operating the combustion system, and the heat resulting during a reduction cycle of the catalyst is in a second temperature range useful in operating the combustion system. The unmixed combustion catalyst is placed in efficient thermal contact with a heat receiver in the combustion system. The catalyst is alternately contacted, to transfer heat between it and the heat receiver, with an oxygen-containing gas to oxidize the catalyst and generate heat in the desired first temperature range, and with a reducing gas to reduce the catalyst resulting in generation of heat, consumption of heat, or no release of heat, as required to achieve the desired second temperature range. Thus, the reaction of the reducing gas with the unmixed combustion catalyst can result in an exothermic, endothermic, or thermoneutral reaction, depending on the unmixed combustion catalyst selected, in order to generate or absorb heat to produce the second temperature range.

A combustion system for generating and transferring heat includes an unmixed combustion catalyst including a mixture of two or more materials, and a heat receiver in efficient thermal contact with the unmixed combustion catalyst. The system further includes a means for alternately contacting the unmixed combustion catalyst with an oxygen-containing gas to oxidize the catalyst and generate heat, and a reducing gas to reduce the catalyst. Such alternate contacting means can include various valve devices utilized in the system, which are discussed in greater detail below. A heat exchanger in communication with the oxygen-containing gas and an outlet from the unmixed combustion catalyst can also be provided in the combustion system. In one embodiment also discussed in greater detail below, the unmixed combustion catalyst is disposed in a catalytic reactor that is surrounded by an insulating structure. The catalytic reactor is in communication with the heat exchanger and a source of fuel and water. In another embodiment, the combustion system can employ an unmixed combustion catalyst made of a single oxidizing/reducing material, as long as a heat exchanger is also used in the system.

EXAMPLES OF THE PREFERRED EMBODIMENTS

The following examples illustrate use of a material which in its reduced state is readily oxidized and which in its oxidized state is readily reduced as a means of oxidizing fuel and effectively delivering the heat thus produced to a particular use. These examples are intended to be purely exemplary of the methods and systems of the invention and should not be viewed as limiting the scope of the present invention.

EXAMPLE 1

Figure 2:
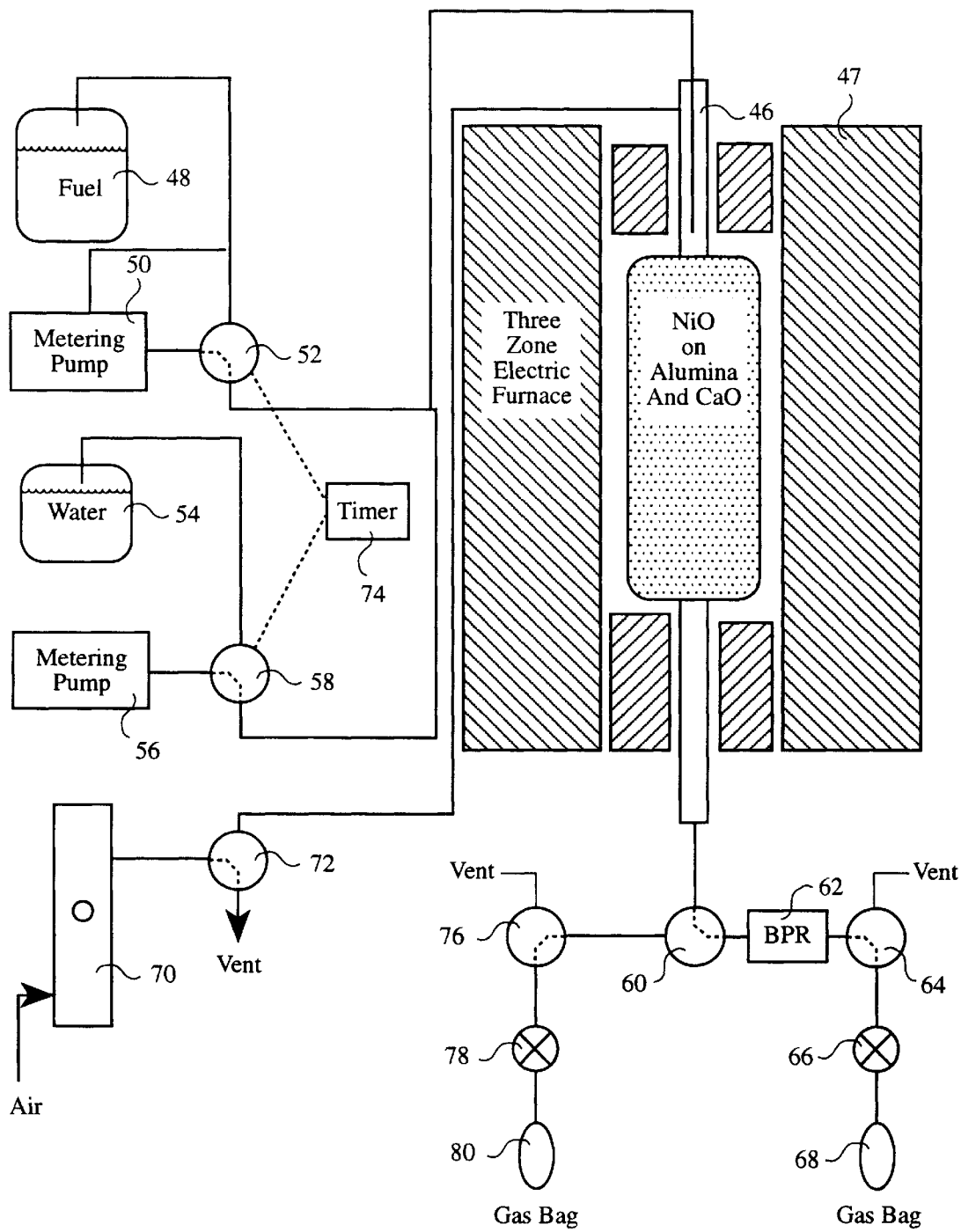
FIG. 2 illustrates a packed bed reactor system for demonstrating the usefulness of unmixed combustion to produce hydrogen.

A packed bed reactor system as shown in FIG. 2 was used to demonstrate, on a laboratory scale, the advantages and limitations of using unmixed combustion for generating hydrogen. In this experimental arrangement, a reactor 46 was held within a three-zone electric furnace 47. A hydrocarbon fuel was directed into the top of reactor 46 from a liquid fuel supply 48 via a first metering pump 50 and through a first three-way supply valve 52. Water was directed into the top of reactor 46 from a water supply 54 via a second metering pump 56 and through a second three-way supply valve 58.

Reactor 46 had an internal volume of 500 cc and contained a mixture of 131.5 grams of $CaCO_3$ which had been calcined to CaO, and 223 grams of 21.1 weight percent nickel oxide on high surface area alumina. The water and liquid hydrocarbon trickled down and vaporized in reactor 46. The hydrocarbon reacted with the NiO reducing it to Ni. The Ni in turn acted as a catalyst for the steam reforming of the hydrocarbon and water into a mixture of CO, $H_2$, and $CO_2$. While this reaction is highly endothermic, the reaction of the CaO with $CO_2$ to form $CaCO_3$ is highly exothermic. The exothermicity of the latter reaction balanced the endothermicity of the former and the overall reaction process was slightly on the exothermic side of thermoneutral.

Because of the water gas shift reaction $CO+H_2O=H_2+CO_2$, CO was in equilibrium with $CO_2$. Consequently removal of $CO_2$ by reaction with the CaO also removed the CO, driving the system toward the production of hydrogen which, on a dry basis, was relatively pure.

The hydrogen thus produced left the reactor via an exit three-way valve 60, passed through a back pressure regulator (BPR) 62, and was vented via a first three-way vent valve 64. Samples of the hydrogen for gas chromatograph analysis were taken by switching three-way vent valve 64 so that the hydrogen flowed through a first gas valve 66 into a gas bag 68.

While the hydrogen was being produced, low pressure air flowed through a rotameter 70, to a second three-way vent valve 72 and went to vent. At periodic intervals, a timer 74 switched the three-way valves 52, 58, 60, and 72. This caused the flows of fuel and water from pumps 50 and 56 to return to supplies 48 and 54, respectively, and caused the flow of low pressure air to pass through reactor 46, leaving via valve 60 and going to vent via a third three-way vent valve 76. Samples for gas chromatograph analysis of the air leaving reactor 46 were taken by switching three-way vent valve 76 so that the air flowed through a second gas valve 78 into a gas bag 80.

Passing air through the reactor caused the nickel to oxidize to nickel oxide and caused the $CaCO_3$ to decompose to CaO and $CO_2$. Since the former is a strongly exothermic reaction, the heat it supplies allows the latter strongly endothermic reaction to occur.

EXAMPLE 2

Hydrogen was produced in a series of experiments by slightly modifying the system illustrated in FIG. 2. The system was modified by replacing metering pump 50 and liquid fuel supply 48 with a rotameter and a cylinder of carbon monoxide gas in order to convert carbon monoxide by steam reforming. The reactor was preconditioned by flowing air through the reactor overnight at 700° C. The experimental conditions included a temperature of 700° C. and a pressure of 4 atm. The input rate for CO was 0.060 moles/min and the input rate of the liquid water was 2.39 cc/min. The samples were measured at five minute intervals.

The results of this series of experiments are shown in Table 1, which lists the dry basis gas chromatograph analysis of the gases going out of the reactor. Table 1 also includes a column labeled ΣCO/CaO indicating the ratio of the number of moles of CO input to the reactor divided by the number of moles of CaO initially present. As shown in Table 1, the percentage of hydrogen in the output gas was initially relatively high. As the reaction proceeded, however, ΣCO/CaO approached and surpassed 1.0 and the ability of the remaining CaO to capture $CO_2$ declined. Consequently the percentage of hydrogen in the output gas decreased. This shows the necessity of periodically regenerating the CaO.

TABLE 1

| SAMPLE | $H_2$ | $CH_4$ | CO | $CO_2$ | ΣCO/CaO |
|---|---|---|---|---|---|
| 1 | 77.4% | 12.2% | 1.9% | 8.5% | 0.229 |
| 2 | 80.6% | 9.9% | 0.65% | 8.8% | 0.458 |
| 3 | not analyzed | | | | |
| 4 | 54.8% | 5.6% | 14.1% | 25.5% | 0.916 |
| 5 | 39.7% | 2.46% | 17.1% | 40.8% | 1.146 |
| 6 | 42.4% | 3.40% | 14.7% | 30.4% | 1.374 |
| 7 | 40.1% | 5.4% | 16.2% | 38.4% | 1.603 |

EXAMPLE 3

After the series of experiments in Example 2 were completed, the system depicted in FIG. 2 was again modified in order to steam reform methane. The carbon monoxide cylinder used in Example 2 was replaced with a cylinder of methane and the CaO was regenerated. The reactor was preconditioned by flowing air through the reactor at a temperature of 700° C. at 6 L/min for 3.5 hours. The experimental conditions included a temperature of 700° C. and a pressure of 7 atm. The input rate for $CH_4$ was 2164 cc/min and the input rate of the liquid water was 1.5 cc/min. The result of this experiment is listed in Table 2, indicating that the present invention is also useful to convert methane to hydrogen.

TABLE 2

| Gases | $H_2$ | $CH_4$ | CO | $CO_2$ |
|---|---|---|---|---|
| Analysis of Output Gases | 77.1% | 20.0% | 2.55% | 0.32% |

EXAMPLE 4

The system depicted in FIG. 2 was modified again in order to steam reform diesel fuel. The CaO was regenerated and diesel fuel was steam reformed with the results shown in Table 3. The experimental conditions included a temperature of 700° C. and a pressure of 8 atm. The input rate for diesel fuel was 1.11 cc/min and the input rate of the liquid water was 1.5 cc/min. The samples were measured at time intervals as indicated in Table 3.

The results of these experiments indicate that the present invention is also useful to convert diesel fuel to hydrogen. The percentage of hydrogen in the gases coming out of the reactor was initially high, but declined as the CaO became exhausted, similar to when carbon monoxide was used in Example 2.

TABLE 3

| SAMPLE | TIME INTERVAL | $H_2$ | $CH_4$ | CO | $CO_2$ |
|---|---|---|---|---|---|
| 1 | 8 minutes | 93% | 2.75% | 0.51% | 3.71% |
| 2 | 13 minutes | 87.4% | 8.63% | 2.98% | 0.97% |
| 3 | 20 minutes | 63.1% | 8.76% | 13.5% | 14.6% |
| 4 | 30 minutes | 62.4% | 8.76% | 13.35% | 15.49% |
| 5 | 40 minutes | 66.0% | 7.9% | 12.2% | 13.9% |

EXAMPLE 5

A series of experiments were conducted with the system shown in FIG. 2 to regenerate the $CaCO_3$ back to CaO by passing air through the reactor. The reactor was not preconditioned for this series of experiments. The experimental conditions included a temperature of 700° C. and a pressure of 1 atm. The input rate for air was 320 cc/min. A wet test meter was used to measure the total volume of gas going out of the reactor and the $CO_2$ content of that gas was determined by gas chromatograph at intervals.

The results tabulated in Table 4 show that the regeneration of the CaO is a rapid process due to the heat provided by the oxidation of the Ni, since the $CO_2$ came out of the reactor in large amounts at the start of the process and then the rate of $CO_2$ evolution sharply declined.

TABLE 4

| GAS VOL. PASSED THROUGH REACTOR | PERCENT OF $CO_2$ |
|---|---|
| 6.615 Liters | 9.4% |
| 12.0 Liters | 0.81% |
| 15.5 Liters | 0.19% |
| 19.0 Liters | 0.12% |

EXAMPLE 6

Another experiment with the FIG. 2 setup was done at a temperature of 700° C. and a pressure of 8 atm, with inputs to the reactor of commercial diesel fuel at 1.1 cc/min and liquid water at 1.5 cc/min. A sample was taken at 13 minutes and analyzed with a Kitagawa gas detector tube. No stain was visible after passage of a recommended volume of sample gas for 1 to 30 ppm sensitivity to $H_2S$. Passing ten times the recommended volume of sample gas also failed to produce an observable stain. This total absence of a stain shows that commercial diesel fuel yielded hydrogen with an $H_2S$ concentration of less than 0.1 ppm.

EXAMPLE 7

Another experiment with the FIG. 2 setup was done at 700° C., in which air at 6050 cc/min was delivered to the reactor for 30 minutes, following which diesel fuel at 1.11 cc/min together with liquid water at 1.5 cc/min, under a pressure of 8 atm, were delivered to the reactor for 10 minutes. This process was repeated for a total of 96 hours. Gas chromatograph analysis of the gases coming out of the reactor showed the gases to be 93.8% hydrogen. This result indicates that the catalyst can be used for a substantial number of cycles.

EXAMPLE 8

In another set of experiments, commercial diesel fuel was used both without addition of thiophene and with enough added thiophene to make the sulfur content 2000 ppm by weight. Experiments were then done with these diesel fuels in which the fuel and water were input to the reactor at 1.11 cc/min and 1.5 cc/min, respectively, with a reactor temperature of 700° C. and a pressure of 8 atm. The output gases were analyzed for $H_2$, $CH_4$, CO, and $CO_2$ by gas chromatograph, and for $H_2S$ with Kitagawa detector tubes. The results of these experiments are shown in Table 5, indicating that the present invention can produce hydrogen of very low $H_2S$ content even when the input fuel has a high sulfur content. This is a major advantage since hydrogen that is to be used in fuel cells needs a very low $H_2S$ content.

TABLE 5

| GASES | $H_2$ | $CH_4$ | CO | $CO_2$ | $H_2S$ ppm |
|---|---|---|---|---|---|
| Fuel without Thiophene | 90.89% | ND* | 0.78% | 8.35% | — |
| Fuel with added Thiophene | 96.1% | ND* | 0.330% | 3.55% | 5 |

*ND = the methane present was too small for determination

EXAMPLE 9

Figure 3:
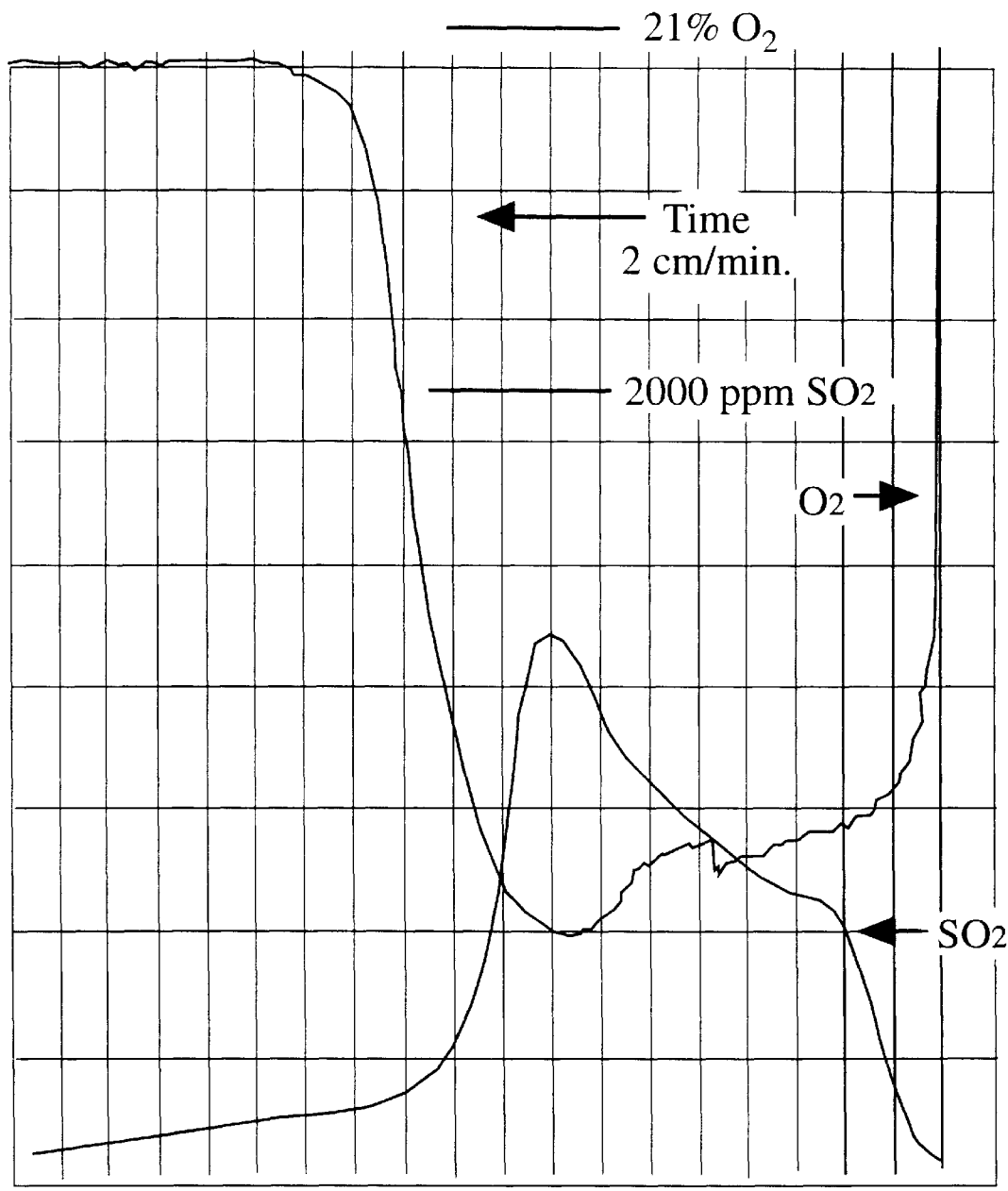
FIG. 3 shows experimental results from a strip chart recording indicating the usefulness of the present invention with fuels containing sulfur.

After the experiments conducted in Example 8, the setup shown in FIG. 2 was modified for another experiment. The gases coming out of the reactor were sent to a Thermoelectron Pulsed Fluorescent SO2 analyzer and a Teledyne $O_2$ meter. Air was passed through the reactor at a rate of 6050 cc/min, at a temperature of 700° C. and a pressure of 1 atm. FIG. 3 shows the recorded outputs of the $SO_2$ and $O_2$ analyzers from a strip chart recording indicating the $SO_2$ and $O_2$ content for the gases leaving the reactor during regeneration with air. This shows that when the present invention is used to produce hydrogen from a fuel which contains sulfur, the sulfur in the fuel is retained in the reactor during the hydrogen production part of the cycle and is discharged as $SO_2$ during the regeneration step.

EXAMPLE 10

In this experiment the setup shown in FIG. 2 was modified so that the gases coming out of reactor 46 were sent to a second reactor. This second reactor was operated at a lower temperature of 510° C. and a pressure of 8 atm, and served to further purify the hydrogen produced in the first reactor. Diesel fuel containing 2000 ppm sulfur was input to the first reactor at 1.11 cc/min, as was water at 1.5 cc/min. Measurement of the gases coming out of the second reactor with a Kitagawa gas detector tube showed no detectable $H_2S$, i.e., less than 1.0 ppm. Measurement with a Thermoelectron Gas Filter Correlation CO Analyzer showed that only 23.4 ppm CO remained in the gases after passage through the purification reactor. This illustrates that passage of the hydrogen produced in a reaction zone at a higher temperature, through a reaction zone at a lower temperature, can greatly improve the purity of the hydrogen. Since some types of fuel cells cannot tolerate CO or $H_2S$ unless their concentrations are kept to very low levels, it is an important advance in the art.

EXAMPLE 11

In Examples 1 through 10, reactor 46 in FIG. 2 experienced two process cycles. In the first cycle (cycle 1), water and a hydrocarbon were fed to reactor 46 and hydrogen was produced while the nickel oxide was reduced to nickel metal. In the second cycle (cycle 2), air was fed to the reactor thereby oxidizing the nickel to nickel oxide and decomposing calcium carbonate to form calcium oxide.

A thermodynamic analysis of Example 1 has been conducted which shows that reactor 46 in FIG. 2 will not operate indefinitely, unless reactor 46 is maintained at an operating temperature by the three-zone furnace 47. In this thermodynamic analysis the following assumptions were made:

(1) water is supplied to reactor 46 as steam at 350° C. and 8 atm absolute pressure;

(2) a hydrocarbon is supplied to reactor 46 as a liquid at 25° C. and 8 atm absolute pressure; and (3) air is supplied to reactor 46 at 25° C. and 1 atm gauge pressure.

Table 6 shows the calculated temperatures and composition of the unmixed combustion catalyst, inert support material, and calcium-based sorbent in reactor 46 as the reactor is cycled through cycle 1 and cycle 2 twice.

TABLE 6

| Component | Mole Fraction | Wt. Fraction | Temperature |
|---|---|---|---|
| Status of reactor at start of the first cycle 1 | | | |
| NiO | 0.4256 | 0.1817 | 1000° C. |
| CaO | 0.5744 | 0.1841 | |
| Inert Support | — | 0.6342 | |
| Status of reactor at end of the first cycle 1 | | | |
| Ni | 0.4256 | 0.1342 | 798° C. |
| CaCO3 | 0.4120 | 0.2214 | |
| CaO | 0.1624 | 0.0489 | |
| Inert Support | — | 0.6342 | |
| Status of reactor at end of the first cycle 2 | | | |
| NiO | 0.3333 | 0.1757 | 945° C. |
| CaO | 0.5584 | 0.2207 | |
| CaCO3 | 0.1083 | 0.0764 | |
| Inert Support | — | 0.5271 | |
| Status of reactor at end of the second cycle 1 | | | |
| Ni | 0.4255 | 0.1306 | 748° C. |
| CaO | 0.0455 | 0.0133 | |
| CaCO3 | 0.5290 | 0.2766 | |
| Inert Support | — | 0.5795 | |
| Status of reactor at end of the second cycle 2 | | | |
| NiO | 0.4255 | 0.1689 | 934° C. |
| CaO | 0.2695 | 0.0802 | |
| CaCO3 | 0.3050 | 0.1621 | |
| Inert Support | — | 0.5889 | |

Table 6 shows that if the reactor is initially at 1000° C., at the end of the first cycle 1 the temperature in the reactor will have dropped to 798° C. During the first cycle 2 the temperature will be raised to only 945° C. and not all of the calcium carbonate will have been decomposed. During the second cycle 1 it is necessary to reduce the amount of water and hydrocarbon that are delivered to the reactor to account for the reduced amount of available calcium oxide for removal of carbon dioxide. At the end of the second cycle 1, the temperature in the reactor is 748° C. At the end of the second cycle 2, the reactor temperature is 934° C. and there is an increased amount of calcium carbonate remaining. This analysis cannot predict the actual temperatures and compositions of the reactor, however, it does accurately predict the trends that will occur. This trend indicates that as reactor 46 is operated in the absence of an external source of heat, during each cycle more of the calcium oxide will be consumed to form calcium carbonate that cannot be decomposed. Furthermore, the temperature during each successive cycle of reactor operation will decline. With progressive consumption of calcium oxide and declining temperatures the reactor will eventually cease to operate. This is a deficiency in the systems described in Examples 1 through 10.

Figure 4:
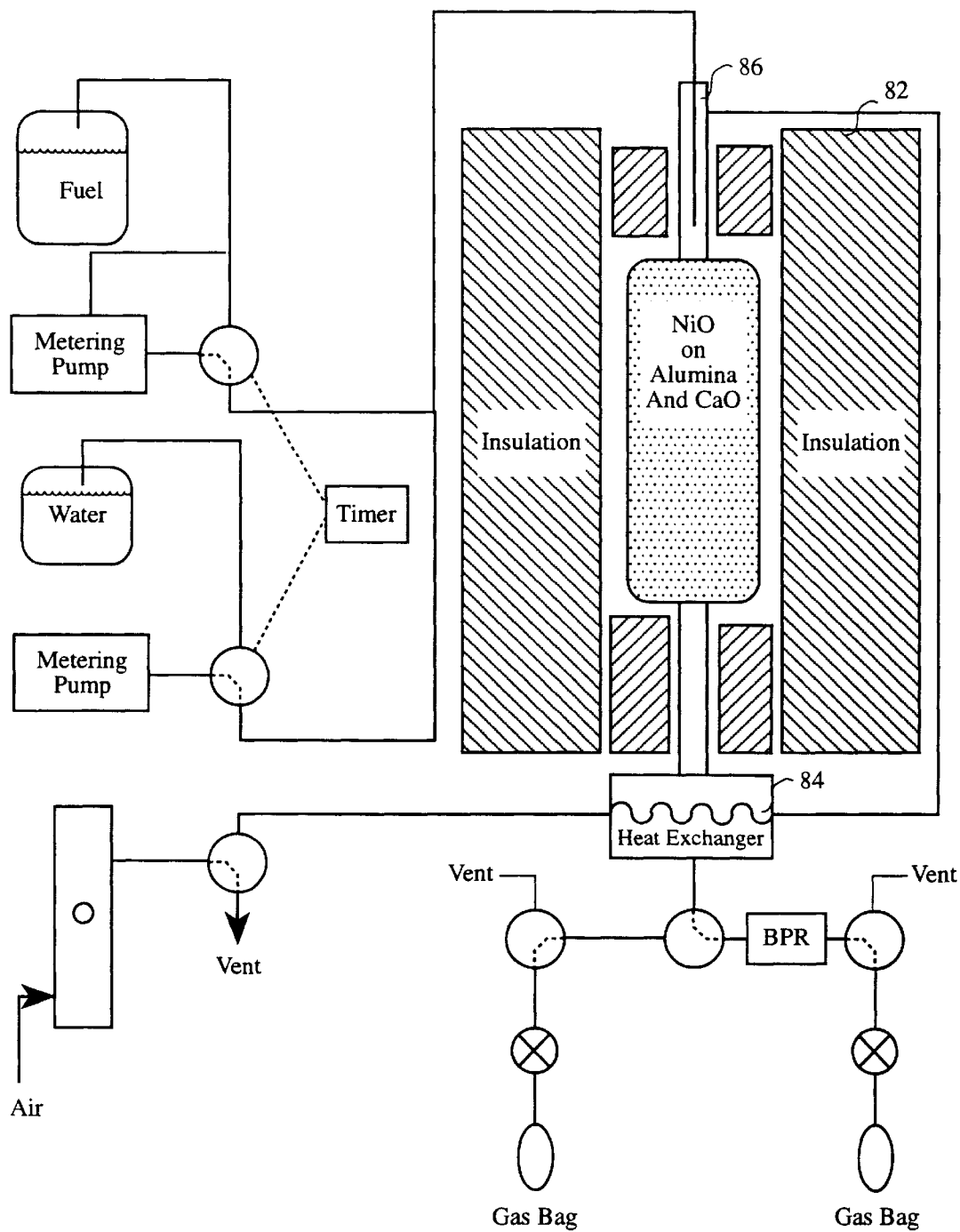
FIG. 4 illustrates the reactor system of FIG. 2 with the addition of a heat exchanger to absorb heat from the steam reforming products and transfer heat to air for purposes of improving the efficiency of a reforming reaction.

A system for avoiding the deficiency identified in Examples 1 through 10 has been developed, which is depicted in the reactor design of FIG. 4. The setup in FIG.

4 is the same as in FIG. 2 except for the replacement of electric furnace 47 with an insulation structure 82, and the addition of a means for transferring heat, such as heat exchanger 84, from the products of cycle 1 to the air delivered to the reactor during cycle 2. Heat exchanger 84 is connected to the output of a reactor 86, and is also in communication with a source of air that communicates with reactor 86. Heat exchanger 84 absorbs heat from the steam reforming products of cycle 1 exiting reactor 86 and stores the heat to transfer it to the air supplied to reactor 86 during cycle 2 to improve the efficiency of the reforming reaction. A thermodynamic analysis of this system was conducted where the conditions were the same as described earlier in Example 2 except that the temperature of the air supplied to the reactor is 777° C. The results of this thermodynamic analysis are shown in Table 7.

TABLE 7

| Component | Mole Fraction | Wt. Fraction | Temperature |
|---|---|---|---|
| NiO | 0.4256 | 0.1817 | 1000° C. |
| CaO | 0.5744 | 0.1841 | |
| Inert Support | — | 0.6342 | |
| Status of reactor at end of the first cycle 1 | | | |
| Ni | 0.4256 | 0.1342 | 798° C. |
| CaCO3 | 0.4120 | 0.2214 | |
| CaO | 0.1624 | 0.0489 | |
| Inert Support | — | 0.6342 | |
| Status of reactor at end of the first cycle 2 | | | |
| NiO | 0.4256 | 0.1817 | 1005° C. |
| CaO | 0.5744 | 0.1841 | |
| Inert Support | — | 0.6342 | |

The thermodynamic analysis in Table 7 shows that if the air supplied to reactor 86 is heated initially to 777° C., then at the end of the first cycle 2 the reactor is returned to a state essentially equivalent to that at the start of the first cycle 1. Therefore, reactor 86 will be able to operate indefinitely through repeated cycles 1 and 2.

EXAMPLE 12

Example 11 addressed a deficiency in Examples 1 through 10 that was resolved by using a heat exchanger 84 as shown in FIG. 4. This example will show an alternative to the use of heat exchanger 84 that will achieve the same results as shown in Example 11. Instead of using a heat exchanger to recover the heat from the products of cycle 1, the process in cycle 1 and cycle 2 can be changed by the replacement of a portion of the nickel oxide with another metal oxide that has a higher heat of oxidation and will therefore release more heat during cycle 2 and less heat during cycle 1, or which may even absorb heat during cycle 1. This is illustrated by the thermodynamic analysis summarized in Table 8. In this example, half of the nickel oxide on a molar basis is replaced by tin oxide.

TABLE 8

| Component | Mole Fraction | Wt. Fraction | Temperature |
|---|---|---|---|
| Status of reactor at start of the first cycle 1 | | | |
| NiO | 0.2128 | 0.0831 | 1000° C. |
| SnO2 | 0.2128 | 0.1680 | |
| CaO | 0.5744 | 0.1685 | |
| Inert Support | — | 0.5804 | |
| Status of reactor at end of the first cycle 1 | | | |
| Ni | 0.2128 | 0.1085 | 772° C. |
| Sn | 0.2128 | 0.2193 | |
| CaCO3 | 0.4849 | 0.4211 | |

TABLE 8-continued

| Component | Mole Fraction | Wt. Fraction | Temperature |
|---|---|---|---|
| CaO | 0.0894 | 0.0435 | |
| Inert Support | — | 0.2077 | |
| Status of reactor at end of the first cycle 2 | | | |
| NiO | 0.2128 | 0.0831 | 1000° C. |
| SnO2 | 0.2128 | 0.1680 | |
| CaO | 0.5744 | 0.1685 | |
| Inert Support | — | 0.5804 | |
| Status of reactor at end of the second cycle 1 | | | |
| Ni | 0.2128 | 0.1085 | 772° C. |
| Sn | 0.2128 | 0.2193 | |
| CaCO3 | 0.4849 | 0.4211 | |
| CaO | 0.0894 | 0.0435 | |
| Inert Support | — | 0.2077 | |

The thermodynamic analysis summarized in Table 8 shows that by selecting a different metal oxide to replace a part of the nickel oxide, the heat released during the metal oxidation step in cycle 2 can be increased relative to the heat released during the hydrocarbon oxidation step in cycle 1. Thereby, the temperature at the end of cycle 1 is reduced and the temperature at the end of cycle 2 is increased. This results in a greater amount of carbon dioxide being absorbed by reaction with calcium oxide during cycle 1, and also results in all of the calcium carbonate being decomposed during cycle 2. This represents a distinct improvement over the system described in Examples 1 through 10.

EXAMPLE 13

In this example, the heat exchanger of Example 11 is used in concert with the mixture of metal oxides of Example 12 to show that the selective use of a mixture of metal oxides can be used along with an improved process design to significantly improve the thermodynamic efficiency of hydrogen production from a hydrocarbon by steam reforming over an unmixed combustion catalyst. Table 9 summarizes a thermodynamic analysis of the system in FIG. 4, wherein reactor 86 is packed with a mixture of nickel oxide and tin oxide supported on a high surface area inert support material such as alumina to form a solid matrix. The reactor is also packed with a sorbent for carbon dioxide such as calcium oxide. In this example, the amount of steam and hydrocarbon that are delivered to the reactor during cycle 1 are increased by a factor of about 1.55. This also necessitates increasing the amount of calcium oxide in reactor 86 by a factor of about 1.55 so that the molar ratio of calcium oxide in reactor 86 to metal oxide increases from 1.35:1 to 2.1:1. In this example, as in Example 11, the air supplied to reactor 86 during cycle 2 is heated to a temperature of 777° C.

TABLE 9

| Component | Mole Fraction | Wt. Fraction | Temperature |
|---|---|---|---|
| Status of reactor at start of the first cycle 1 | | | |
| NiO | 0.1613 | 0.0761 | 1000° C. |
| SnO2 | 0.1613 | 0.1537 | |
| CaO | 0.6774 | 0.2396 | |
| Inert Support | — | 0.5306 | |
| Status of reactor at end of the first cycle 1 | | | |
| Ni | 0.1629 | 0.0539 | 755° C. |
| Sn | 0.1629 | 0.1092 | |
| CaCO3 | 0.5681 | 0.3236 | |
| CaO | 0.1093 | 0.0349 | |
| Inert Support | — | 0.4784 | |
| Status of reactor at end of the first cycle 2 | | | |
| NiO | 0.1613 | 0.0761 | 1000° C. |

TABLE 9-continued

| Component | Mole Fraction | Wt. Fraction | Temperature |
|---|---|---|---|
| SnO2 | 0.1613 | 0.1537 | |
| CaO | 0.6774 | 0.2396 | |
| Inert Support | — | 0.5306 | |
| Status of reactor at end of the second cycle 1 | | | |
| Ni | 0.1629 | 0.0539 | 755° C. |
| Sn | 0.1629 | 0.1092 | |
| CaCO3 | 0.5681 | 0.3236 | |
| CaO | 0.1093 | 0.0349 | |
| Inert Support | — | 0.4784 | |

In the first cycle 1 summarized in Table 9, the average temperature of reactor 86 has declined to 755° 0C. at the end of the cycle. At the end of the first cycle 2, however, the average temperature of reactor 86 has returned to 1000° C., and the composition of the solid matrix in the reactor has returned to the original state it had at the beginning of the first cycle 1. Therefore, in this example it has been shown that it is possible to improve the performance of a reactor by the selective use of two or more unmixed combustion catalysts combined with the use of heat exchangers to improve the process efficiency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States letters patent is:

1. A method of generating and transferring heat in an unmixed combustion system, comprising the steps of:
   (a) providing a catalyst for unmixed combustion which in a reduced state is readily oxidized and in an oxidized state is readily reduced, the catalyst comprising at least one catalyst material having an oxidizable form and a reducible form which is selected from the group consisting of tin/tin oxide, iron(II) oxide/iron(III) oxide iron(II) oxide/iron(II,III) oxide, iron (II,III) oxide/iron (III) oxide, cobalt(II,III) oxide/cobalt(IV) oxide, chromium(III) oxide/chromium(IV) oxide, manganese (II,III) oxide/manganese(IV) oxide, calcium molybdite/calcium molybdate, and combinations thereof the catalyst material selected such that:
      (i) heat resulting during an oxidation cycle of the catalyst is in a first temperature range useful in operating the combustion system; and
      (ii) heat resulting during a reduction cycle of the catalyst is in a second temperature range useful in operating the combustion system;
   (b) placing the catalyst in efficient thermal contact with a heat receiver in the combustion system; and
   (c) contacting the catalyst, to release and transfer heat to the heat receiver, alternately with:
      (i) an oxygen-containing gas to oxidize the catalyst and generate heat in the first temperature range; and
      (ii) a reducing gas to reduce the catalyst in a reaction that is exothermic, endothermic, or thermoneutral as required to generate or absorb heat to produce the second temperature range.

2. The method of claim 1, wherein the oxygen-containing gas is selected from the group consisting of air, air to which additional oxygen has been added, air mixed with combustion products, air from which part of the oxygen has been removed, and any of the aforementioned oxygen-containing gases to which inert or combustible gases have been added.

3. The method of claim 1, wherein the mixture of materials is supported on a porous ceramic.

4. The method of claim 3, wherein the porous ceramic is selected from the group consisting of silica, alumina, magnesia, silicon carbide, cordierite, zeolites, and combinations or mixtures thereof.

5. The method of claim 3, wherein the porous ceramic is alumina.

6. The method of claim 4, wherein the combustion system includes a catalytic reactor for housing the catalyst to carry out an endothermic reaction, and a source of a fuel for producing the reducing gas.

7. The method of claim 6, wherein the endothermic reaction is the decomposition of ammonia to hydrogen and nitrogen.

8. The method of claim 1, wherein the catalyst is supported on a porous ceramic.

9. The method of claim 6, wherein the endothermic reaction is the decomposition of methanol.

10. The method of claim 6, wherein the endothermic reaction is the steam reforming of a hydrocarbon to produce hydrogen.

11. The method of claim 1, wherein the combustion system includes a catalytic reactor for housing the catalyst to carry out an endothermic reaction, and a source of fuel for producing the reducing gas.

12. The method of claim 11, wherein the catalyst further comprises a noble metal co-catalyst.

13. The method of claim 11, wherein the fuel is natural gas or carbon monoxide.

14. The method of claim 11, wherein the fuel is a liquid hydrocarbon.

15. The method of claim 11, wherein the fuel is a petroleum distillate selected from the group consisting of kerosene, gasoline, diesel fuel, jet fuel, and mixtures thereof.

16. The method of claim 11, wherein the fuel is an emulsion of a hydrocarbon or liquid petroleum fuel in water including an emulsion of bitumen or bitumen products in water.

17. The method of claim 10, wherein the combustion system includes a first reaction zone at a temperature in a range from about 700° C. to 1050° C. at which most of the reaction between the hydrocarbon and steam occurs, and a second reaction zone at a temperature of less than about 700° C. where the hydrogen produced in the first reaction zone is purified.

18. The method of claim 17, wherein compressed air, partially oxygen depleted by use in a fuel cell, is used as an oxidizing agent to oxidize the catalyst to a higher oxidation state in an exothermic reaction, thereby causing the decomposition of $CaCO_3$ produced during the reduction cycle to CaO and $CO_2$, and heating the partially oxygen depleted compressed air.

19. The method of claim 18, further comprising the steps of:
   (a) heating the partially oxygen depleted compressed air by passage through a bed of additional catalyst for unmixed combustion whereby any hydrogen or other fuels in the air are oxidized,
   (b) passing the oxygen depleted compressed air through a turboexpander to generate power, and
   (c) driving a turbocompressor with the power from the turboexpander to produce compressed air.

20. The method of claim 1, wherein the combustion system includes a heat exchanger in communication with the oxygen-containing gas and an outlet from the catalyst.

21. An unmixed combustion system for generating and transferring heat, comprising:
(a) a catalyst for unmixed combustion which in a reduced state is readily oxidized and in an oxidized state is readily reduced, the catalyst comprising a mixture of at least two materials each of which has an oxidizable form and a reducible form, the mixture of materials selected such that:
  (i) heat resulting during an oxidation cycle of the catalyst is in a first temperature range useful in operating the combustion system, the first temperature range during the oxidation cycle being from about 900° C. to about 1100° C.; and
  (ii) heat resulting during a reduction cycle of the catalyst is in a second temperature range useful in operating the combustion system, the second temperature range during the reduction cycle being from about 600° C. to about 950° C.;
(b) a heat receiver in efficient thermal contact with the catalyst; and
(c) means for contacting the catalyst, to release and transfer heat to the heat receiver, alternately with:
  (i) an oxygen-containing gas to oxidize the catalyst and generate heat in the first temperature range; and
  (ii) a reducing gas to reduce the catalyst in a reaction that is exothermic, endothermic, or thermoneutral as required to generate or absorb heat to produce the second temperature range.

22. The system of claim 21, wherein the catalyst is supported on a porous ceramic.

23. The system of claim 21, further comprising a catalytic reactor for housing the catalyst to carry out an endothermic reaction, and a fuel source for producing the reducing gas.

24. The system of claim 23, wherein the endothermic reaction is the decomposition of ammonia to hydrogen and nitrogen.

25. The method of claim 17, wherein compressed air, partially oxygen depleted by use in a fuel cell, is used as an oxidizing agent to oxidize the catalyst in an exothermic reaction, thereby causing the decomposition of $CaCO_3$ produced during the step of contacting the catalyst with a reducing gas to CaO and $CO_2$, and heating the partially oxygen depleted compressed air.

26. The system of claim 23, wherein the endothermic reaction is the decomposition of methanol.

27. The system of claim 23, wherein the endothermic reaction is the steam reforming of a hydrocarbon to produce hydrogen.

28. An unmixed combustion system for generating and transferring heat, comprising:
(a) a catalyst for unmixed combustion which in a reduced state is readily oxidized and in an oxidized state is readily reduced, the catalyst comprising at least one catalyst material having an oxidizable form and a reducible form which is selected from the group consisting of tin/tin oxide, iron(II) oxide/iron(III) oxide, iron(II) oxide/iron(II,III) oxide, iron (II,III) oxide/iron (III) oxide, cobalt(II,III) oxide/cobalt(IV) oxide, chromium(III) oxide/chromium(IV) oxide, manganese(II,III) oxide/manganese(IV) oxide, calcium molybdite/calcium molybdate, and combinations thereof, the catalyst material selected such that:
  (i) heat resulting during an oxidation cycle of the catalyst is in a first temperature range useful in operating the combustion system; and
  (ii) heat resulting during a reduction cycle of the catalyst is in a second temperature range useful in operating the combustion system;
(b) a heat receiver in efficient thermal contact with the catalyst; and
(c) means for contacting the catalyst, to release and transfer heat to the heat receiver, alternately with:
  (i) an oxygen-containing gas to oxidize the catalyst and generate heat in the first temperature range; and
  (ii) a reducing gas to reduce the catalyst in a reaction that is exothermic, endothermic, or thermoneutral as required to generate or absorb heat to produce the second temperature range.

29. The system of claim 21, wherein the catalyst further comprises a noble metal co-catalyst.

30. The system of claim 21, further comprising a heat exchanger in communication with the oxygen-containing gas and an outlet from the catalyst.

31. A method of generating and transferring heat in an unmixed combustion system, comprising the steps of:
(a) providing a mixture of two or more materials, each of which has an oxidizable form and a reducible form, to form a catalyst for unmixed combustion which in a reduced state is readily oxidized and in an oxidized state is readily reduced, the mixture of materials including nickel/nickel oxide and at least one material selected from the group consisting of tin/tin oxide, chromium(III) oxide/chromium(IV) oxide, iron(II) oxide/iron(III) oxide, iron(II) oxide/iron(II,III) oxide, iron (II,III) oxide/iron(III) oxide, cobalt(II,III) oxide/cobalt(IV) oxide, manganese(II,III) oxide/manganese(IV) oxide, and calcium molybdite/calcium molybdate, the mixture of materials selected such that:
  (i) heat resulting during an oxidation cycle of the catalyst is in a first temperature range useful in operating the combustion system; and
  (ii) heat resulting during a reduction cycle of the catalyst is in a second temperature range useful in operating the combustion system;
(b) placing the catalyst in efficient thermal contact with a heat receiver in the combustion system, the heat receiver comprising calcium oxide; and
(c) contacting the catalyst, to release and transfer heat to the heat receiver, alternately with:
  (i) an oxygen-containing gas to oxidize the catalyst and generate heat in the first temperature range; and
  (ii) a reducing gas to reduce the catalyst in a reaction that is exothermic, endothermic, or thermoneutral as required to generate or absorb heat to produce the second temperature range, wherein calcium carbonate produced during the reduction of the catalyst is substantially decomposed to calcium oxide and carbon dioxide during oxidation of the catalyst.

32. An unmixed combustion system for generating and transferring heat, comprising:
(a) a catalyst for unmixed combustion which in a reduced state is readily oxidized and in an oxidized state is readily reduced, the catalyst comprising a mixture of at least two materials each of which has an oxidizable form and a reducible form, the mixture of materials including nickel/nickel oxide and at least one material selected from the group consisting of tin/tin oxide, chromium(III) oxide/chromium(IV) oxide, iron(II) oxide/iron(III) oxide, iron(II) oxide/iron(II,III) oxide, iron (II,III) oxide/iron(III) oxide, cobalt(II,III) oxide/cobalt(IV) oxide, manganese(II,III) oxide/manganese (IV) oxide, and calcium molybdite/calcium molybdate, the mixture of materials selected such that:
  (i) heat resulting during an oxidation cycle of the catalyst is in a first temperature range useful in operating the combustion system; and
  (ii) heat resulting during a reduction cycle of the catalyst is in a second temperature range useful in operating the combustion system;
(b) a heat receiver in efficient thermal contact with the catalyst the heat receiver comprising calcium oxide; and
(c) means for contacting the catalyst, to release and transfer heat to the heat receiver, alternately with:
  (i) an oxygen-containing gas to oxidize the catalyst and generate heat in the first temperature range; and
  (ii) a reducing gas to reduce the catalyst in a reaction that is exothermic, endothermic, or thermoneutral as required to generate or absorb heat to produce the second temperature range, wherein calcium carbonate produced during the reduction of the catalyst is substantially used to calcium oxide and carbon dioxide during oxidation of the catalyst.

33. A method of generating and transferring heat in an unmixed combustion system, comprising the steps of:
(a) providing a catalyst for unmixed combustion which in a reduced state is readily oxidized and in an oxidized state is readily reduced, the catalyst comprising:
  (i) a first catalyst material having an oxidizable form and a reducible form selected from the group consisting of silver/silver oxide, copper/copper oxide, iron/iron oxide, cobalt/cobalt oxide, tungsten/tungsten oxide, manganese/manganese oxide, molybdenum/molybdenum oxide, nickel/nickel oxide, tin/tin oxide, strontium sulfide/strontium sulfate, barium sulfide/barium sulfate, iron/iron (II) oxide, iron/iron (III) oxide, iron(II) oxide/iron(III) oxide, iron(II) oxide/iron(II,III) oxide, iron (II,III) oxide/iron(III) oxide, cobalt(II,III) oxide/cobalt(IV) oxide, chromium(III) oxide/chromium(IV) oxide, manganese(II,III) oxide/manganese(IV) oxide, and calcium molybdite/calcium molybdate;
  (ii) a second catalyst material different from the first catalyst material and having an oxidizable form and a reducible form, the second catalyst material selected from the group consisting of tin/tin oxide, iron(II) oxide/iron(III) oxide, iron(II) oxide/iron(II,III) oxide, iron (II,III) oxide/iron(III) oxide, cobalt (II,III) oxide/cobalt(IV) oxide, chromium(III) oxide/chromium(IV) oxide, manganese(II,III) oxide/manganese(IV) oxide, and calcium molybdite/calcium molybdate; the first and second catalyst materials selected such that:
  (iii) heat resulting during an oxidation cycle of the catalyst is in a first temperature range useful in operating the combustion system; and
  (iv) heat resulting during a reduction cycle of the catalyst is in a second temperature range useful in operating the combustion system;
(b) placing the catalyst in efficient thermal contact with a heat receiver in the combustion system; and
(c) contacting the catalyst, to release and transfer heat to the heat receiver, alternately with:
  (i) an oxygen-containing gas to oxidize the catalyst and generate heat in the first temperature range; and
  (ii) a reducing gas to reduce the catalyst in a reaction that is exothermic, endothermic, or thermoneutral as required to generate or absorb heat to produce the second temperature range.

34. The method of claim 33, wherein the second catalyst material is selected from the group consisting of iron(II) oxide/iron(III) oxide, iron(II) oxide/iron(II,III) oxide, iron (II,III) oxide/iron(III) oxide, cobalt(II,III) oxide/cobalt(IV) oxide, chromium(III) oxide/chromium(IV) oxide, manganese(II,III) oxide/manganese(IV) oxide, and calcium molybdite/calcium molybdate.

* * * * *

UNITED STATES PATENT AND TRADEMARK OFFICE
CERTIFICATE OF CORRECTION

| | |
|---|---|
| PATENT NO. | : 6,007,699 |
| DATED | : December 28, 1999 |
| INVENTOR(S) | : Jerald A. Cole |

It is certified that error appears in the above-identified patent and that said Letters Patent is hereby corrected as shown below:

Title page,
References Cited, please insert the following U.S. patent documents:
    5,827,496    Lyon Column 1,
Line 3, please insert the following:
-- This invention was made with Government support under DAAHO1-95-C-R162 awarded by the U.S. Army Aviation and Missile Command. The Government has certain rights in this invention. --

Column 9,
Line 1, after "oxide/iron(III)" change "oxidc" to -- oxide --

Column 17,
Line 27, change "SO2" to -- $SO_2$ --

Column 21,
Line 15, change "0C." to -- C. --

Column 25,
Line 10, after "catalyst" insert a comma
Line 21, after "substantially" change "used" to -- decomposed --

Column 26,
Line 13, after "molybdate;" insert a paragraph break

Signed and Sealed this

Sixth Day of November, 2001

*Attest:*

NICHOLAS P. GODICI
*Attesting Officer*     *Acting Director of the United States Patent and Trademark Office*